United States Patent [19]

Yonehara et al.

[11] 3,839,224

[45] Oct. 1, 1974

[54] OXIDATION CATALYST FOR PURIFYING EXHAUST GASES OF INTERNAL COMBUSTION ENGINES

[75] Inventors: Kiyoshi Yonehara, Suita; Tomohisa Ohhata; Haruichi Hara, both of Toyonaka, all of Japan

[73] Assignee: Nippon Shokubai Kagaku Kogyo Co. Ltd., Osaka, Japan

[22] Filed: Oct. 3, 1972

[21] Appl. No.: 294,521

[30] Foreign Application Priority Data

Oct. 4, 1971    Japan.............................. 46-77150

[52] U.S. Cl.............. 252/443, 252/455 R, 252/465, 252/466 B, 252/466 J, 252/466 PT, 252/477, 423/213.2, 423/213.5
[51] Int. Cl........................ B01j 11/12, B01j 11/16
[58] Field of Search........ 252/477, 443, 455 R, 463, 252/465, 466 J, 466 GT, 466 B; 423/213, 214, 213.5

[56] References Cited
UNITED STATES PATENTS

| | | | |
|---|---|---|---|
| 3,255,027 | 6/1966 | Talsma....................... | 252/477 R X |
| 3,331,787 | 7/1967 | Keith et al.......................... | 252/439 |
| 3,441,381 | 4/1969 | Keith et al................. | 252/477 R X |
| 3,441,382 | 4/1969 | Keith et al................. | 252/477 R X |
| 3,489,809 | 1/1970 | Keith et al................. | 252/477 R X |
| 3,515,677 | 6/1970 | Pochowicz......................... | 252/430 |
| 3,597,165 | 8/1971 | Keith et al................. | 252/477 R X |

*Primary Examiner*—Patrick P. Garvin
*Attorney, Agent, or Firm*—Armstrong, Nikaido & Wegner

[57] ABSTRACT

An oxidation catalyst for purifying exhaust gases of internal combustion engines comprising a monolithic multicellular chemically inert refractory support of an apparent bulk density of 0.2 to 0.7 g/cc having therein 25 to 300 gas flow channels per square inch of its cross-sectional area and supporting thereon a deposit of activated alumina and a deposit of at least one heavy metal oxide, the weight ratio of the alumina to the heavy metal oxide being 1:0.2 to 1:0.5, the total weight of the two deposits being 130 to 500 g per liter of the catalyst on the average total thickness of the two deposits being 50 to 300 microns and preparing the same.

18 Claims, No Drawings

OXIDATION CATALYST FOR PURIFYING EXHAUST GASES OF INTERNAL COMBUSTION ENGINES

This invention relates to oxidation catalysts of honeycomb structure for purifying exhaust gases of internal combustion engines and method of preparing the same. In more particular, it is concerned with high active, durable oxidation catalysts comprising heavy metal oxides and alumina supported on a carrier or support of honeycomb structure for oxidizing noxious air polluting substances contained in the exhaust gases from internal combustion engines, i.e., carbon monoxide and unburnt hydrocarbons or oxygenated organic substances, prior to their discharge into the atmosphere to innoxious carbon dioxide and water.

It has been ascertained by many research workers that the exhaust gases from automotive vehicles having internal combustion engines operating on gasoline, liquefied petroleum gases and like fuels are primarily responsible for the serious air pollution problem now confronting large cities.

Carbon monoxide has been known, from long ago, to be a noxious substance for human beings. In addition thereto, it has recently been disclosed that organic gases produced by incomplete combustion of such fuels as mentioned above have close relation to occurrence of so called "photochemical smog" and the importance of removal of such noxious substance by complete oxidation, especially purification of the exhaust gases by means of oxidation catalysts is now increasing rapidly.

For attaining these purposes, there have already been developed various purifying apparatus packed with a granular, pellet or bead type catalysts, but they have grave drawbacks that, when they are mounted to automobile bodies, there occurs abrasion of catalyst particles by friction therebetween caused by mechanical vibrations from the body and pulsative exhaust of engine to shorten the activity and life of the catalyst and that they cause a new pollution by dusts of the catalyst.

It is known that the aforesaid problem of abrasion of catalyst is solved by use, in place of the granular catalysts, of a catalyst composed of a catalytically active substance on a unitary carrier or support of the structure having a plurality of parallel narrow gas flow paths or channels comparted by thin walls and extending from one inlet end to the other outlet end of the unitary support, so called "honeycomb support."

All the oxidation catalysts of honeycomb structure which have already been put to practical use are composed of a noble metal or metals as, e.g., platinum as a catalytically active substance on a support, as disclosed in U.S. Pat. Nos. 3,331,787, 3,441,381 and 3,441,382.

A common feature of these honeycomb catalysts is that they are composed of a heat resistant honeycomb support supporting thereon 2 to 5 g, per liter of carrier, of platinum together with a small amount of alumina, and these catalytic activities are such that may be expressed by the conversion of carbon monoxide and of hydrocarbons of 70 to 90 percent, as indicated in "Kagaku Kogyo (Chemical Industry)", No. 2 to 7 (1971). However, these catalysts have drawbacks that the noble metals as platinum are very expensive and restricted in resources to fulfil the increasing demand. In addition, the catalysts containing a noble metal as a primary active substance have the shortcoming that their catalytic activity is remarkably decreased by the toxity of lead compounds in exhaust gases originating from an antiknocking agent contained in gasolin, as described in "Shokubai (Catalyst)", 6, 390 – 398 (1964). The drawbacks of the prior catalysts all have been overcome by the present invention.

Accordingly, it is an object of the present invention to provide improved oxidation catalysts of honeycomb structure for purifying the exhaust gases of internal combustion engines and method of preparing such catalysts.

It is an another object of the present invention to provide oxidation catalysts of honeycomb structure for purifying the exhaust gases of internal combustion engines, having a long life and a high catalytic activity, and method of preparing the same.

It is a further object of the present invention to provide inexpensive oxidation catalysts for purifying the exhaust gases of internal combustion engine and method of preparing the same.

It is a still another object of the present invention to provide improved oxidation catalysts for purifying the exhaust gases discharged from automobiles.

In accordance with the present invention, these objects are attained by the oxidation catalyst for purifying the exhaust gases of internal combustion engines comprising a monolithic multi-cellular, chemically inert refractory support having an apparent bulk density of 0.2 to 0.7 g/cc and 25 to 300 gas flow paths per square inch of its cross-section and a catalytically active layer supported on the surfaces of the support, said catalytically active layer being of an average thickness of 50 to 300 microns, supported in an amount of 130 to 500 g per liter of the finished catalyst and derived from activated alumina and heavy metal oxides in the weight ratio of the alumina to the heavy metal oxides of 1:0.2 to 1:0.5.

In another embodiment, the catalyst comprises a monolithic support as mentioned above and, supported thereon, a first deposit of such an alumina as mentioned above in an amount of 50 to 200 g per liter of the finished catalyst after calcination and the second deposite of a mixture of such an alumina and heavy metal oxides in the weight ratio of the total of the alumina in the first and second deposits to the heavy metal oxides of 1:0.2 to 1:0.5, the total amount of the first and second deposits being 130 to 500 g per liter of the finished catalyst and the average thickness of the deposit layer being 50 to 300 microns.

In the third embodiment of catalyst of the present invention, the first deposit of the activated alumina is deposited in an amount, after calcination, of 100 to 375 g per liter of the finished catalyst and then the second deposit of the heavy metal oxides is deposited in an amount as to provide a weight ratio of the alumina to the heavy metal oxides of 1:0.2 to 1:0.5, a total amount of the two deposits of 130 g to 500 g per liter of the finished catalyst and the average thickness of the deposit layer of 50 to 300 microns.

As the result of pursuance of durable catalysts which comprise a refractory honeycomb support supporting thereon at least one heavy metal oxide, such as copper oxides, chromium oxides, nickel oxides, iron oxides, cobalt oxides or manganese oxides, and an activated alumina and have high activities for oxidation of carbon monoxide and hydrocarbons, we have found that the catalytic activity for oxidation of carbon monoxide and hydrocarbons is influenced to a great extent by the weight ratio of the alumina to the heavy metal oxides, the total amount of the alumina and heavy metal oxides on unit area of the catalyst and the thickness of the deposit of the catalytically active oxides and, in addition, the average pore size and average pore volume of the catalyst.

The catalyst of the present invention having a high activity and a long life in oxidation of carbon monoxide and hydrocarbons in the exhaust gases of internal combustion engine possesses the following characteristics:

1. the weight ratio of the activated alumina to the heavy metal oxides is within the range of 1:0.2 to 1:0.5, the total amount thereof is in the range of 130 to 500 g per liter of the catalyst, and the average thickness of the deposit layer thereof is in the range of 50 to 300 microns, 2. the monolithic multicellular chemically inert refractory support to be used is of an apparent bulk density of 0.2 to 0.7, preferably 0.25 to 0.50 g/cc and contains 25 to 300, preferably 50 to 250 gas flow channels per square inch of its cross-section.

In accordance with the present invention, by using an activated alumina and heavy metal oxides in such a ratio as mentioned above the adhesion of the deposited catalytically active layer to the support is enhanced and the amount of the deposited layer can be increased, and a high activity and a long life or durability of catalyst are obtained by adopting such an amount and such an average thickness of the deposit layer. The aforesaid monolithic multicellular chemically inert refractory support makes it possible to reduce the weight of catalyst, to minimize the resistance to gas flow and substantially completely prevent the abrasion of catalyst.

The refractory support or carrier of the present invention onto which the activated alumina and heavy metal oxides are supported is a solid, unitary or monolithic, skeletal body having a plurality of unobstructed openings or channels therethrough in a direction of desired fluid flow and is preferably sized and shaped to cover at least a major portion of the cross-sectional area of the refraction zone in which it is to be used.

The support or carrier is constructed of a substantially chemically inert, substantially catalytically inactive rigid solid material capable of maintaining its shape and strength at high temperatures, for example up to 1,100°C or more, and has a low coefficient of thermal expansion resisting expansion and shrinkage accompanying rapid change of temperature. The material has an apparent bulk density of 0.2 to 0.7 g/cc, preferably 0.25 to 0.50 g/cc and a number of holes per square inch (cell density) of 25 to 500, preferably 50 to 250. Channels of the support can be in the shape, e.g., of triangles, rectangles, sinusoids, circles, honeycombs, corrugates, criss-cross split, etc. Therefore, "honeycomb structure" in the present invention means these structures. Further, the support has considerable accessible porosity as distinguished from the substantially nonporous procelain utilized for electrical appliances. The accessible pore volume not including the volume of the fluid flow channels is at least 0.15 cc/g measured by means of water absorption.

Typical materials of the refractory are cordierite, aluminosilicates containing lithium, petalite, spondume, mullite, silimanite, magnesium silicate, zircon, silicon carbide, alpha-alumina and the like. Among these, a cordierite support is put in market under a trade name of AlSiMag 795 and alpha-alumina supports are under trade names of AlSiMag 614 and AlSiMag 776 by American Lava Corporation.

According to the present invention, the use of the honeycomb supports having such features as mentioned above makes it possible to lighten the catalyst itself, to noticiably reduce the time from the start of an engine to the light-on of a purifying apparatus (at which the apparatus becomes active.) and to minimize the back pressure imposed to an exhaust system, thereby, to minimize the decrease of capacity of an engine.

The term "activated alumina" used in the present invention means alumina in transition state from aluminum hydroxide to alpha-alumina in the course of calcination of aluminum hydroxide to alpha-alumina, usually termed "gamma-alumina" including alumina in crystal form of gamma, pseudo-gamma, rho, eta, delta, chi, kappa and theta, and aluminum compounds capable of being converted to alumina of the aforesaid crystal forms by heat treatment, such as, e.g., bayerite, boehmite, pseudo-boehmite and diaspore. The alumina is usually used in a form of an aqueous slurry in which the aforesaid support is immersed to impregnate therewith alumina in an amount of 50 to 200, preferably 70 to 150 g per liter of the carrier or finished catalyst after drying and calcination. The activated alumina is preferably of a particle size distribution that at least 80 percent by weight of particle are sizes of 2 to 50 microns. This particle size distribution of activated alumina results in an average pore size in the surface of the catalyst of about 1 to 10 microns which contributes the high activity. To the aqueous slurry there may be added a small amount of an alumina sol or an aqueous alumina solution for adjusting viscosity and enhancing coating film formed from the slurry, but it is desired in this case to avoid contamination by alkali metal compounds as possible.

The heavy metal oxides used in the present invention include oxides of copper, chromium, nickel, iron, cobalt, manganese, zinc, tin, bismuth, silver, cerium and like heavy metals, though preferred are oxides of copper, chromium, nickel, iron, cobalt and manganese, especially of chromium, copper and nickel. These oxides may be used in the form of compounds capable of being converted by calcination into oxides, such as nitrates, e.g., copper nitrates, nickel nitrates and cobalt nitrates; organic salts, e.g., nickel acetates, copper acetates, cobalt acetates, nickel formate; metallic oxi-acid salts, e.g., ammonium bichromate; chlorides, e.g., copper chlorides, nickel chloride; and hydroxides, e.g., iron hydroxides, as well as oxides themselves. The heavy metal oxides or precursors thereof should be used in an amount as to provide in a finished catalyst a weight ratio of alumina to heavy metal oxides of 1:0.2 to 1:0.5.

The activity of the catalyst of the present invention may be enhanced by supporting palladium on its surface, usually from a water-soluble palladium compound, such as palladium nitrate, palladium chloride or palladium acetate.

The catalyst of the present invention may be prepared in the manners as hereinafter set forth.

In a way, the aforesaid support is immersed in an aqueous slurry containing a gamma- or rho-alumina or aluminium compound capable of being converted by heat treatment into an activated alumina and a heavy metal oxide or heavy metal compound converted by calcination into heavy metal oxides or heavy metal compounds to impregnate it with the alumina and heavy metal oxides or their precursors and, after drying, calcined at temperatures of 300° to 600°C in oxidative atmosphere. The weight ratio of the alumina to the heavy metal oxides in the aforesaid slurry should be 1:0.2 to 1:0.5. The total amount of the alumina and heavy metal oxides supported on the support should be 130 to 500 g per liter of the finished catalyst. The activated alumina to be used is preferably of such particle size distribution as mentioned above that at least 80 percent by weight of particles are of sizes of 2 to 50 microns. Although there may be added a small amount of an alumina sol or an aqueous alumina solution for viscosity adjustment and strengthen the coating film to the aqueous slurry, the contamination of the slurry by alkalis should be avoided as possible. The thickness of the supported catalytically active deposit should be controlled in average to 50 to 300 microns.

In the second way, the aforesaid support is immersed in a portion of an aqueous slurry of the aforesaid activated alumina to impregnate it with 50 to 200 g of the alumina per liter of the support, dried and calcined at temperatures of 300° to 600°C in an oxidative atmosphere. The support is then immersed in an aqueous slurry comprising a mixture of the remainder of the aforesaid activated alumina and the heavy metal oxides or their precursors to deposit on its surface the alumina and heavy metal oxides in the total amount after calcination, per liter of the finished catalyst, of 130 to 500 g to form a deposit layer of an average thickness after calcination of 50 to 300 microns and containing the alumina and the heavy metal oxides in a weight ratio of 1:0.2 to 1:0.5, and, after drying, calcined at temperatures of 300° to 600°C in an oxidative atmosphere. Accordingly, the total amount of the activated alumina and the heavy metal oxides deposited in the second immersion is 80 to 300 g per liter of the finished catalyst. In this case, also, there may be used an alumina sol or an aqueous alumina solution.

In the third way, the aforesaid support is immersed in an aqueous slurry of the aforesaid activated alumina to deposite 100 to 375 g of alumina per liter of the finished catalyst and, after drying, calcined at 300° to 600°C in an oxidative atmosphere. The support thus treated is then immersed in an aqueous solution or slurry containing the heavy metal oxides or their precursor and, after drying, calcined at 300° to 600°C in an oxidative atmosphere. In this case, the amount of the active deposit layer per liter of the finished catalyst is 130 to 500 g, the weight ratio of alumina to heavy metal oxides in the deposit layer is 1:0.2 to 1:0.5 and the average thickness of the deposite layer is 50 to 300 microns. Of course, there may be used an alumina sol or an aqueous alumina solution, if desired.

In the preparation of the catalyst in accordance with the present invention, there is occasionally supported palladium on the catalyst by immersing the supported catalyst thus formed in an aqueous solution containing a small amount of a water-soluble palladium salt, such as palladium nitrate, palladium chloride, palladium acetate or the like, and, after drying, calcining the so treated supported catalyst at temperatures of 300° to 600°C. Palladium is usually supported in an amount of 0.2 to 2, preferably 0.5 to 1.5 g per liter of the finished catalyst.

As mentioned above, the present invention makes it possible to provide oxidation catalyst of honeycomb structure which have a synergistic high catalytic activity for oxidation of carbon monoxide and hydrocarbons contained in the exhaust gases from internal combustion engines, and retain their high initial activity after running test by 20,000 km, through choice of a special support, a special weight ratio of activated alumina to heavy metal oxide supported on the support, a special thickness of the deposited catalytically active layer on the support and a special particle size distribution of activated alumina.

EXAMPLE 1

A honeycomb support of 18 mm diameter by 40 mm length (volume of about 10 cc), having 40 cylindrical gas flow channels each of an inner diameter of 1.5 to 2.0 mm, weighed 2.2 g and formed of cordielite was immersed in a slurry prepared by dispersing 30 g of a finely divided gamma-alumina of which at least 80 percent by weight of particles were of sizes of 2 to 50 microns in a hot solution of 10 cc of conc. nitric acid in 50 g of an alumina sol containing 15 percent by weight of alumina. The support was shaken for about 5 minutes in the slurry, withdrawn from the slurry, dried at room temperature for at least 2 hours and calcined at 100° to 110°C for 2 hours and then at 500° to 600°C for at least 2 hours in an electric furnace. This was repeated twice as to support 0.8 g of a film of activated alumina on the support.

The calcination should be conducted carefully because quick heating and cooling occasionally result cracks in or breakage of the support and/or the coating film.

The support thus coated with gamma-alumina was then immersed in a slurry prepared by dispersing in 25 cc of distilled water a mixture of 12.1 g of copper nitrate, 20.0 g of chromium nitrate, 4.1 g of iron nitrate, 30 g of a finely divided gamma-alumina of which at least 80 percent by weight of particles are of sizes of 2 to 50 microns and 1.3 g of a water-soluble boehmite, dried and calcined to obtain a supported catalyst suporting 0.3 g of mixed heavy metal oxides and 0.6 g of an activated alumina. The drying and calcination were carried out more carefully and for a longer time than the drying and calcination in the former alumina coating step.

The supported catalyst formed was packed in a stainless steel reaction tube of an inner diameter of 19 to 20 mm and there was passed therethrough a gaseous mixture containing 1 percent by volume of carbon monoxide, 500 ppm of propylene, 5 percent by volume of oxygen and balance of nitrogen which gaseous mixture had been saturated with water vapor prior to introduction into the reaction tube, at a temperature of the gaseous mixture at the inlet for the catalyst of 200° to 400°C and at a space velocity of 15,000 hr$^{-1}$ (150 normal liter/hr). The gaseous mixture at the outlet of the catalyst was analysed by means of NDIR (Non-diffusive infrared analyser) with respect to carbon monoxide and by means of FID (Flame ionization detector) with respect to hydrocarbons to determine the conversions of carbon monoxide to carbon dioxide and hydrocarbons to carbon dioxide and water. The results obtained were as summarized in the Table 1. In the supported catalyst of this example, the weight ratio of alumina to heavy metal oxides was 1:0.214 and the thickness of supported active layer was 190 microns.

trate, 5.9 g of nickel nitrate and 50 g of a finely divided gamma-alumina containing at least 80 percent by weight of particles of sizes of 2 to 50 microns in 25 cc Table 1

| Temperature at inlet (°C) | CO conversion (%) | H. C. conversion (%) |
|---|---|---|
| 200 | 24.8 | 1.9 |
| 250 | 79.4 | 24.5 |
| 300 | 99.0 | 69.1 |
| 400 | 99.5 | 97.5 |

EXAMPLE 2

A similar honeycomb support of a volume of about 10 cc as used in Example 1 was immersed in a slurry prepared by dispersing 30 g of a finely divided rho-alumina of a particle size distribution that at least 80 percent by weight of particles were of sizes of 2 to 50 microns in an aqueous solution of 5 g of a water soluble boehmite in 50 cc of distilled water and was then calcined in the same way as in Example 1 to obtain an activated alumina-coated support. The support was then immersed in a slurry of 24 g of chromium nitrate and 8.7 g of nickel nitrate and 20 g of a finely divided rho-alumina of a particle size distribution that at least 80 percent by weight of particles were of sizes of 2 to 50 microns and then dried and calcined in the same manner as in Example 1. The viscosity of the slurry was adjusted by addition thereto of 5 cc of a 10 percent alumina sol, and the immersion was repeated twice to support 0.4 g of oxide (NiO + $Cr_2O_3$) and 1.2 g of an activated alumina. The support was finally immersed for 5 minutes in a solution of 1.09 g of palladium nitrate in 100 cc of distilled water and, after drying, calcined at 500° to 600°C for 5 hours to support thereon 0.004 g of palladium. The supported catalyst thus obtained was subjected to the same tests as in Example 1 to obtain results as summarized in the Table 2. The weight ratio of alumina to heavy metal oxide in the catalyst was 1:0.2 and the thickness of the supported catalytically active layer was 260 microns, and the amount of palladium supported was 0.4 g/liter-catalyst.

of distilled water and adding thereto 5 cc of a 10 percent alumina sol, dried and calcined at 500° to 600°C for 5 hours or more to support thereon 1.0 g of a mixed oxide (as CuO, $Cr_2O_3$ and NiO) and 2.5 g of an activated alumina.

The supported catalyst was subjected to a venti-activity test using an actual exhaust gas from an internal combustion engine. The engine used was of a 6 cylindered, 2,000 cc, OHC type and provided with a loading apparatus corresponding to road load. Portion of the exhaust gas from this engine running at a fixed speed of 2,000 rpm was mixed with secondary air sent from an air pump to adjust its oxygen content to 5 to 6 percent and introduced at a space velocity of 30,000 $hr^{-1}$ (12.5 N liter/min.) into the carrier bed. The temperature of the gaseous mixture was controlled to 300° to 500°C at the inlet for the catalyst bed. The exhaust gas was analysed by means of NDIR and FID to obtain results as summarized in the Table 3. The weight ratio of alumina to heavy metal oxide in this catalyst was 1:0.22 and the thickness of its catalytically active deposite was 240 microns.

Table 3

| Temperature at inlet (°C) | CO conversion (%) | H.C. conversion (%) |
|---|---|---|
| 300 | 90 – 92 | 64 – 66 |
| 400 | 96 – 98 | 80 – 82 |
| 500 | 97 – 99 | 94 – 96 |

EXAMPLE 4

Three catalysts each consisting of a couple of cylindrical cordielite honeycomb supports having a diameter of 100 mm and a length of 100 mm (volume of 0.78 liter), an average bulk density of 0.3 g/cc and 100 to 110 cylindrical gas flow channels of a diameter of 1.8 to 2.0 mm per square inch was packed into three stainless steel axial type mufflers respectively and subjected to durability tests on a commercial automobile on a Table 2

| Temperature at inlet (°C) | CO conversion (%) | H.C. conversion (%) |
|---|---|---|
| 200 | 97.1 | 90.4 |
| 250 | 98.8 | 96.5 |
| 300 | 99.0 | 97.7 |
| 400 | 99.5 | 98.0 |

EXAMPLE 3

A cylindrical mullite honeycomb support of 28 mm diameter and 40 mm length (volume of about 25 cc) having about 100 cylindrical cells, weighed 6.0 g was coated with 2.0 g of an active alumina in the same manner as in Example 2 and calcined. The support was then immersed in a slurry prepared by dissolving or dispersing 24.1 g of copper nitrate, 40.0 g of chromium nitrate, chassis dynamometer. The catalysts were prepared in the similar manner as in Example 2 except that there were used in this example two slurries of catalytically active substances different in solid content from each other to obtain three catalysts different in amount of heavy metal oxides supported, as indicated in the following Table 4. The Catalyst No. 1 contained heavy metal oxides in a less amount than directed by the present invention and, therefore, was for comparison.

Table 4

| Cat. No. | Gamma-alumina coating (g/l) | Slurry concentration | Number of immersion and calcination | Amount of oxide (g/l) | Amount of alumina deposited with the oxide (g/l) | Final weight (g) |
| --- | --- | --- | --- | --- | --- | --- |
| 1 | 80 | ½ | 1 | 22 | 55 | 460 |
| 2 | 85 | ½ | 2 | 50 | 130 | 565 |
| 3 | 85 | 1 | 1 | 55 | 140 | 580 |

| Bulk density (g/cc) | Amount of Pd (g/l) | Weight ratio of alumina to oxide | Total amount of deposits (g/l) |
| --- | --- | --- | --- |
| 0.46 | 0.45 | 1 : 0.163 | 157.5 |
| 0.57 | 0.50 | 1 : 0.232 | 265.5 |
| 0.58 | 0.47 | 1 : 0.244 | 280.5 |

Each of the three catalysts thus obtained was subjected to determination of activity as oxidation catalyst by packing in a stainless steel container located at 80 cm from the exhaust manifold of a commercial 4-cylindered 1,900 cc displacement engine with automatic transmission connected to an eddy type dynamometer and also a flywheel which imposes an inertia corresponding to the weight of the automobile.

The capabilities of catalyst were evaluated by the test method as determined in California, U.S.A., in 1968. In the following Table 5, there were summarized the modes of this 7 modes method, the time schedule and the weighting factors.

Since there was added air from an air pump mounted to the engine as secondary air to the exhaust gas just prior to introduction into the muffler packed with the catalyst and, consequently, the dilution of exhaust gas was different from mode to mode, the measured values of gases at the inlet and outlet of the muffler were compensated by the dilution factor calculated by the following equation and the compensated values were summarized in the following Table 6 and 7.

$$\text{Dilution factor} = \frac{14.5}{\text{½ CO conc. (\%)} + CO_2 \text{ conc. (\%)} + \text{H.C. conc. (\%)}}$$

In the provision of California, U.S.A., the average emission during sequential operations of first four cycles from the start is called "warm-up cycle," the emission in the fifth cycle is not calculated and the average emission in the sixth and seventh cycles is called "hot cycle."

The results of determination of the activities for oxidation of carbon monoxide and for hydrocarbons of Catalyst No. 1 and Catalyst No. 3 in the warm-up cycle were respectively summarized in Tables 6 and 7.

Table 5

| Sequence | Mode mph | Acceleration (mph/sec) | Time (sec) | Total time (sec) | Weighting factor |
| --- | --- | --- | --- | --- | --- |
| 1 | idle | — | 20* | 20 | 0.042 |
| 2 | 0 – 25 | 2.2 | 11.5 ⎱14 | 31.5 | 0.244 |
| 3 | 25 – 30 | 2.2 | 2.5 ⎰ | 34 | ** |
| 4 | 30 | — | 15 | 49 | 0.118 |
| 5 | 30 – 15 | –1.4 | 11 | 60 | 0.062 |
| 6 | 15 | — | 15 | 75 | 0.050 |
| 7 | 15 – 30 | 1.2 | 12.5 ⎱29 | 87.5 | 0.455 |
| 8 | 30 – 50 | 1.2 | 16.5 ⎰ | 104 | ** |
| 9 | 50 – 20 | –1.2 | 25 | 129 | 0.029 |
| 10 | 20 – 0 | –2.5 | 8 | 137 | ** |

Note: * In the first cycle, idled at 1,100 rpm for 40 sec.
** Not calculated.

Table 6

(Comparative Example)

| | | CO | | | H.C. | |
| --- | --- | --- | --- | --- | --- | --- |
| | Mode | Inlet (%) | Outlet (%) | Conversion (%) | Inlet (ppm) | Outlet (ppm) | Conversion (%) |
| 1 | idle | 4.02 | 0.738 | 81.7 | 15820 | 1335 | 91.6 |
| 2 | 0–25 | 1.95 | 0.178 | 90.8 | 11515 | 1282 | 88.9 |
| 3 | 30 | 1.15 | 0.126 | 89.1 | 5282 | 1082 | 79.6 |
| 4 | 30–15 | 3.60 | 0.992 | 72.5 | 21005 | 5997 | 73.4 |
| 5 | 15 | 4.70 | 0.602 | 87.3 | 7480 | 1424 | 80.9 |
| 6 | 15–30 | 1.32 | 0.181 | 86.3 | 5376 | 1110 | 79.4 |
| 7 | 50–20 | 4.17 | 0.184 | 95.6 | 45360 | 3507 | 92.3 |

Table 7

| | | Oxidation activity of Cat. No.3 | | | | |
|---|---|---|---|---|---|---|
| | | CO | | | H.C. | |
| | Mode | Inlet (%) | Outlet (%) | Conversion (%) | Inlet (ppm) | Outlet (ppm) | Conversion (%) |
| 1 | idle | 3.95 | 0.518 | 86.7 | 16024 | 1100 | 94.1 |
| 2 | 0-25 | 1.90 | 0.111 | 94.2 | 11316 | 913 | 92.0 |
| 3 | 30 | 1.12 | 0.094 | 91.6 | 5184 | 773 | 85.1 |
| 4 | 30-15 | 3.75 | 0.484 | 87.1 | 20400 | 2933 | 85.6 |
| 5 | 15 | 4.73 | 0.282 | 94.0 | 7431 | 612 | 91.7 |
| 6 | 15-30 | 1.15 | 0.044 | 96.2 | 5430 | 466 | 91.4 |
| 7 | 50-20 | 4.25 | 0.149 | 96.5 | 47035 | 1258 | 97.3 |

It will be noticed by comparison of the results shown in the Table 6 with those in the Table 7 that the catalyst supporting a larger amount of heavy metal oxides, i.e., Cat. No. 3, is superior.

The analysis of exhaust gases was made by means of MEXA-18, manufactured by Kabushiki Kaisha Horiba Seisakusho, recording on a multi-pen recorder by NDIR with respect to CO and $CO_2$ and by FID with respect to hydrocarbons concurrently.

The three catalysts, No. 1 to 3, were subjected to a durability test until 20,000 Km run using a non-leaded gasolin. The results were as summarized in the following Table 8.

On the test the engine was operated alternately at a speed corresponding to 60 Km/hr and a speed corresponding to 80 Km/hr at periods of 2 minutes. On each change of speed, the engine was always decelerated to a speed corresponding to 30 Km/hr and immediately accelerated to the prescribed speeds at full throttle. The evaluation of the oxidation activity of catalyst at each measuring point was made on the hot cycle in the 7 modes method provided by California as mentioned above. The results were as shown in the following Table 8. The values shown in the Table 8 were calculated by summing up the product of an average gas concentration and a weighting factor in each mode.

EXAMPLE 5

A solution of 24.2 g of copper nitrate and 14.9 g of zinc nitrate in 160 cc of distilled water was heated to 50° to 60°C and added with a solution of 25.2 g of ammonium bichromate in 30 cc of a 28 percent aqueous ammonia, and the mixture was maintained at 50° to 60°C for a while to form a precipitate. The precipitate was filtered and dried, and 20 g of the dried precipitate was mixed with 40 g of a finely divided rho-alumina powder containing at least 80 percent by weight of particles of sizes of 2 to 50 microns and then dispersed in 40 cc of a commercially available 10 percent alumina sol. A cordielite honeycomb support of a weight of 3.0 g which had been coated with about 0.8 g of an activated alumina in the manner as in Example 2 was immersed in the slurry to deposit thereon concurrently an activated alumina and a mixed heavy metal oxide, dried and calcined. By this treatment, on the support there were supported activated-alumina and mixed heavy metal oxides in a total amount of 1.6 g. The weight ratio of alumina to heavy metal oxides in the supported catalyst was 1:0.22 and the total amount thereof was 240 g/liter. The supported catalyst was subjected to an activity test in the same manner as in Example 1 to obtain results as shown in the Table 9.

Table 8

| Cat. No. | Fresh catalyst | | | | |
|---|---|---|---|---|---|
| | Inlet CO (%) | Outlet CO (%) | CO conversion (%) | Inlet H.C. (ppm) | Outlet H.C. (ppm) |
| 1 | 1.708 | 0.026 | 98.5 | 4667 | 291 |
| 2 | 1.715 | 0.034 | 98.0 | 4872 | 239 |
| 3 | 1.680 | 0.030 | 98.2 | 5310 | 217 |

| After 10,000 Km run | | | | |
|---|---|---|---|---|
| H.C. conversion (%) | Inlet CO (%) | Outlet CO (%) | CO conversion (%) | Inlet H.C. (ppm) |
| 93.8 | 1.635 | 0.053 | 96.8 | 4903 |
| 95.1 | 1.789 | 0.044 | 97.5 | 5040 |
| 95.9 | 1.406 | 0.031 | 97.8 | 5206 |

| After 20,000 Km run | | | | |
|---|---|---|---|---|
| Outlet H.C. (ppm) | H.C. conversion (%) | Inlet CO (%) | Outlet CO (%) | CO conversion (%) |
| 1175 | 76 | 1.313 | 0.072 | 94.5 |
| 413 | 91.8 | 1.613 | 0.061 | 96.2 |
| 357 | 93.2 | 1.428 | 0.043 | 97.0 |

| Inlet H.C. (ppm) | Outlet H.C. (ppm) | H.C. conversion (%) |
|---|---|---|
| 4571 | 2157 | 52.8 |
| 4925 | 576 | 88.3 |
| 5060 | 501 | 90.1 |

The Table 8 indicates that Catalyst No. 1 which is outside the scope of the present invention is far inferior in durability to Catalyst No. 2 3 in accordance with the present invention.

Table 9

| Temperature at inlet (°C) | CO conversion (%) | H.C. conversion (%) |
|---|---|---|
| 200 | 50.7 | 5.5 |
| 250 | 87.1 | 38.0 |
| 300 | 95.5 | 80.2 |
| 400 | 98.8 | 96.8 |

EXAMPLE 6

A honeycomb support formed of a alumino-silicate containing lithium having a diameter of 18 mm and a length of 40 mm (volume of 10 cc), weighed 3.0 g, was coated with a finely divided gamma-alumina containing at least 80 percent by weight of particles of sizes of 2 to 50 microns in the similar manner as in Example 1 to obtain an alumina-coated supported of a weight, after drying and calcination, of 3.8 g.

On the other hand, a solution of 24.2 g of copper nitrate and 12.5 g of manganese nitrate in 160 cc of distilled water was heated to 50 to 60 C and then added with a solution of 25.2 g of ammonium bichromate in 30 cc of a 28 percent aqueous ammonia. A reddish brown precipitate thus formed was filtered, washed with water and dried. In an aqueous solution formed by dissolving 40 g of 15 percent alumina sol with 8 cc of concentrated nitric acid, there were dispersed 20.0 g of the dried precipitate and 20.0 g of a finely divided rho-alumina containing over 80 percent by weight of particles of sizes of 2 to 50 microns to form a slurry. The aforesaid alumina-coated support was then immersed in the slurry for 5 minutes, taken out of the slurry, dried and calcined to support thereon an activated alumina and mixed heavy metal oxides in a total amount of 1.60 g.

The catalyst was subjected to a oxidation activity test in the same manner as in Example 1 to obtain a result as shown in the Table 10.

Table 10

| Temperature at inlet (°C) | CO conversion (%) | H.C. conversion (%) |
|---|---|---|
| 200 | 45.0 | 8.2 |
| 250 | 88.2 | 48.3 |
| 300 | 98.5 | 92.0 |
| 400 | 99.5 | 97.2 |

EXAMPLE 7

In 20 cc of distilled water there were dissolved 28.0 g of chromium nitrate, 4.8 g of nickel nitrate and 4.8 g of cobalt nitrate and then dispersed therein 20 g of a finely divided rho-alumina of a particle size distribution that at least 80 percent by weight of particles were of sizes of 2 to 50 microns to form a slurry. The slurry was then added with 5 cc of a 10 percent alumina sol to adjust its viscosity. A cordielite support which had been coated with at least 0.8 g of a finely divided rho-alumina containing at least 80 percent by weight of particles of sizes of 2 to 50 microns in the same manner as in Example 2 was immersed in the aforesaid slurry, dried and calcined to support thereon anew an activated alumina and mixed heavy metal oxides in a total amount of 1.6 g.

The supported catalyst thus obtained was immersed in a solution of 1.09 g of palladium nitrate in 100 cc of water and then dried and calcined in the same manner as in Example 2 to support thereon 0.004 g of palladium.

The palladium-containing supported catalyst was subjected to an oxidation activity test in the same way as in Example 1 to obtain the results as summarized in the Table 11. The weight ratio of total alumina to mixed heavy metal oxides in the catalyst was 1:0.23 and the total amount of the deposits was 240 g/liter.

Table 11

| Temperature at inlet (°C) | CO conversion (%) | H.C. conversion (%) |
|---|---|---|
| 200 | 96.5 | 92.5 |
| 250 | 98.1 | 95.8 |
| 300 | 98.7 | 98.2 |
| 400 | 99.2 | 99.0 |

EXAMPLE 8

In a solution prepared by adding 15 cc of a conc. nitric acid to 100 g of an alumina sol containing 15 percent by weight of alumina and heating the mixture to 70°C to effect solution, there were dispersed 45 g of a finely divided rho-alumina containing at least 80 percent by weight of particles of sizes of 2 to 50 microns and 25 g of alumina trihydrate supplied by ALCOA under a trade name of C–331 trihydrated alumina to form a slurry.

A cylindrical cordielite honeycomb support of a diameter of 18 mm and a length of 40 mm, volume of 10 cc and weighed 4.8 g, having about 150 gas flow channels per square inch was immersed for 2 minutes in the slurry, blowed off excess slurry by compressed air, dried in air for 3 hours and then at 120°C for 2 hours. This procedure was repeated again and the double coated support was calcined at 500°C for 3 hours to support 1.5 g of an activated alumina.

The support was then immersed in a solution of 20 g of ammonium bichromate in 100 cc of distilled water for 1 hour while heating at 80°C on a warm water bath. The support taken out of the ammonium bichromate solution was dried at 100°C for 2 hours and calcined at 550°C for 3 hours in a stream of air to deposit thereon 0.5 g of $Cr_2O_3$. The support was then immersed in an aqueous palladium nitrate of a strength of 6 g-Pd/l-solution and calcined at 550°C for 2 hours to deposit 0.009 g of palladium. In the supported catalyst thus prepared, the weight ratio of alumina to heavy metal oxides was 1:0.33, the amount of catalytically active oxides was 200 g/l and the thickness of the supported active layer was 130 microns.

The catalyst was tested in the same manner as in Example 1 to obtain the results as shown in the Table 12.

Table 12

| Temperature at inlet (°C) | CO conversion (%) | H.C. conversion (%) |
|---|---|---|
| 200 | 94.1 | 72.4 |
| 250 | 98.5 | 94.3 |
| 300 | 99.5 | 97.4 |
| 400 | 99.8 | 98.1 |

EXAMPLE 9

In a solution prepared by adding 15 cc of a concentrated nitric acid to 100 g of an alumina sol containing 15 percent by weight of alumina and heating the mixture to 70°C there were dispersed 45 g of a finely divided rho-alumina having a particle size distribution that at least 80 percent by weight of particles were of sizes of 2 to 50 microns and 25 g of an alumina trihydrate, C–331 alumina trihydrate supplied by ALCOA, to form a slurry. A cylindrical cordielite honeycomb support of a diameter of 28 mm and a length of 50 mm (volume of 30 cc and weight of 14.5 g) having gas flow channels in a cel density of about 150 per square inch was immersed in the slurry and then processed in the same manner as in Example 8 to deposit thereon 4.5 g of an activated alumina. The support was then immersed in a solution of 40 g of ammonium bichromate in 200 cc of water and subsequently in an aqueous palladium nitrate and calcined, in the same manner as in Example 8, to obtain a supported catalyst supporting 1.5 g of $Cr_2O_3$ and 0.03 g of Pd. In the catalyst, the weight ratio of $Al_2O_3$ to heavy metal oxide was 1:0.33 and the amount of deposited layer was 193 g/liter. The catalyst was subjected to the activity test in the same manner as in Example 3 using portion of an exhaust gas from an operating engine to obtain the results as summarized in the Table 13.

Table 13

| Temperature at inlet (°C) | CO conversion (%) Initial | CO conversion (%) After 100 hrs. | H.C. conversion (%) Initial | H.C. conversion (%) After 100 hrs. |
| --- | --- | --- | --- | --- |
| 300 | 92.5 | 92.2 | 82.1 | 80.3 |
| 400 | 96.8 | 96.5 | 92.2 | 91.7 |
| 500 | 98.5 | 98.4 | 94.5 | 94.2 |

EXAMPLE 10

On the same support as used in Example 9 there was deposited 4.4 g of an activated alumina in the same manner as in Example 9.

The support was then immersed in a solution of 120 g of chromium nitrate and 43.5 g of nickel nitrate in 200 cc of distilled water for 1 hour on a water bath maintained at 80°C, taken out of the solution, dried at 100°C for 2 hours, calcined at 550°C for 3 hours in a stream of air, immersed in an aqueous palladium nitrate of a strength of 6 g-Pd/l-solution and calcined at 550°C for 2 hours to deposite thereon 0.03 g of palladium. The results of the same test on the catalyst as in Example 3 were shown in the Table 14. In the catalyst, the weight ratio of $Al_2O_3$ to heavy metal oxides was 1:0.36 and the total amount of the deposits was 200 g/liter.

Table 14

| Temperature at inlet (°C) | CO conversion (%) | H.C. conversion (%) |
| --- | --- | --- |
| 300 | 93.5 | 83.8 |
| 400 | 97.1 | 93.7 |
| 500 | 99.5 | 94.8 |

EXAMPLE 11

In 150 g of an alumina sol containing 15 percent by weight of alumina there was dissolved 45 g of chromic anhydride, then dispersed therein 100 g of a finely divided rho-alumina of a particle size distribution that at least 80 percent by weight of particles were of sizes of 2 to 50 microns to form a slurry.

A cordielite support as used in Example 9 was immersed for 2 minutes in the slurry, taken out of the slurry, blowed off excess slurry by compressed air, dried in air for 3 hours and dried at 110°C for 2 hours. This procedure was repeated again and, thereafter, the support was calcined at 500°C for 5 hours to deposite thereon 5.1 g of alumina and 1.5 g of $Cr_2O_3$. On the catalyst there was deposited 0.025 g of palladium in the same manner as in Example 9.

The supported catalyst thus obtained was subjected to the same activity test as in Example 3 to obtain the results as shown in the Table 15.

Table 15

| Temperature at inlet (°C) | CO conversion (%) | H.C. conversion (%) |
| --- | --- | --- |
| 300 | 87.4 | 75.6 |
| 400 | 96.2 | 88.5 |
| 500 | 97.0 | 92.2 |

EXAMPLE 12

To 30 cc of an alumina sol containing 15 percent by weight of alumina there was added 5 cc of a conc. nitric acid, then 30 cc of distilled water, 108 g of chromium nitrate and 60 g of a finely divided rho-alumina of a particle size distribution that at least 80 percent by weight of particles were of sizes of 2 to 50 microns to form a slurry.

The same cordielite honeycomb support as used in Example 9 on which had been deposited 2.5 g of activated-alumina in the same procedure as in Example 9 was immersed in the slurry and calcined at 550°C for 5 hours to obtain a supported catalyst supporting 3.5 g of alumina and 1.3 g of $Cr_2O_3$.

On the catalyst was then deposited 0.02 g of palladium in the same manner as in Example 9.

The catalyst thus prepared was tested in the same manner as in Example 3 to obtain the results as shown in the Table 16.

In the catalyst, the weight ratio of $Al_2O_3$ to $Cr_2O_3$ was 1:0.22 and the total amount thereof was 243 g/liter.

Table 16

| Temperature at inlet (°C) | CO conversion (%) | H.C. conversion (%) |
| --- | --- | --- |
| 300 | 88.7 | 78.6 |
| 400 | 97.1 | 90.3 |
| 500 | 98.8 | 93.9 |

EXAMPLE 13

In 150 g of an alumina sol containing 15 percent by weight of alumina there was dissolved 45 g of chromic anhydride, and the solution was diluted with 30 cc of distilled water.

In the solution there dispersed 32 g of cuprous oxide ($Cu_2O$) and 8.1 g of mapico yellow (FeOOH) and then 200 g of a finely divided rho-alumina of a particle size distribution that at least 80 percent by weight of particles were of sizes of 2 to 50 microns to form a slurry.

A cordielite honeycomb support of a diameter of 18 mm and a length of 40 mm (volume of about 10 cc and weight of 4.8 g), and of a cell density of about 150 channels per square inch, was immersed in the slurry twice in the same manner as in Example 11 and then calcined at 500°C for 5 hours to obtain a supported catalyst supporting 1.1 g of alumina and 0.5 g of metal oxides ($Cr_2O_3$ + CuO + $Fe_2O_3$).

The weight ratio of $Al_2O_3$ to heavy metal oxides in the catalyst was 1:0.45 and the total amount of thereof was 160 g/liter.

The catalyst was subjected to the same activity test as in Example 1 to obtain the results as shown in the Table 17.

Table 17

| Temperature at inlet (°C) | CO conversion (%) | | H.C. conversion (%) | |
|---|---|---|---|---|
| | Initial | After 20 hrs. | Initial | After 20 hrs. |
| 200 | 30.7 | 3.0 | 3.0 | 2.0 |
| 250 | 85.3 | 81.8 | 38.7 | 30.6 |
| 300 | 98.5 | 97.7 | 77.2 | 75.5 |
| 400 | 99.2 | 98.5 | 98.1 | 96.7 |

EXAMPLE 14

The same procedure for the preparation of catalyst as in Example 10 was repeated except that silicon carbide (weight of 14.0 g) was used as the support and tested in the same way. Similar results were obtained.

EXAMPLE 15 (Comparative)

The same procedure for the preparation of catalyst as in Example 13 was repeated except that the support was immersed in the slurry once, not twice, to obtain a supported catalyst supporting 0.5 g of $Al_2O_3$ and 0.2 g of metal oxides ($Cr_2O_3$ + CuO + $Fe_2O_3$). In the catalyst, the weight ratio of $Al_2O_3$ to heavy metal oxides was 1:0.4, the total amount thereof was 90 g/liter and the thickness of the active oxide layer was 35 microns.

The catalyst was subjected to the same activity test as in Example 1 to obtain the results as shown in the Table 18.

Table 18

| Temperature at inlet (°C) | CO conversion (%) | | H.C. conversion (%) | |
|---|---|---|---|---|
| | Initial | After 20 hrs. | Initial | After 20 hrs. |
| 200 | 26.3 | 2.0 | 2.5 | 0 |
| 250 | 82.6 | 18.4 | 27.5 | 2.0 |
| 300 | 95.2 | 46.0 | 72.0 | 27.1 |
| 400 | 96.8 | 75.9 | 93.9 | 50.8 |

What is claimed is:

1. An oxidation catalyst for purifying exhaust gases of internal combusion engines consisting essentially of a monolithic multicellular chemically inert refractory support of an apparent bulk density of 0.2 to 0.7 g/cc having therein 25 to 300 gas flow channels per square inch of its cross-sectional area and supporting thereon a deposit of an activated alumina, a deposit of at least one heavy metal oxide, and a deposit on said alumina and said heavy metal oxide of from 0.2 to about 1.5 g. palladium per liter of finished catalyst, the weight ratio of the alumina to the heavy metal oxide being 1:0.2 to 1:0.5, the total weight of the two deposits being 130 to 500 g per liter of the catalyst and the average total thickness of the two deposits being 50 to 300 microns, said heavy metal oxide being the oxide of at least one metal selected from the group consisting of copper, chromium, nickel, iron, cobalt and manganese.

2. A catalyst according to claim 1, wherein the heavy metal oxide is the oxide of at least one metal selected from the group consisting of copper, chromium and nickel.

3. A catalyst according to claim 1, wherein the refractory support is formed of a refractory selected from the group consisting of cordielite, alumino-silicates containing lithium, mullite and silicon carbide.

4. A catalyst according to claim 1, wherein the activated alumina is at least one member selected from the group consisting of gamma-, pseudo-gamma-, rho-, eta-, delta-, chi-, kappa- and theta-alumina.

5. An oxidation catalyst for purifying exhaust gases of internal combustion engines consisting essentially of a monolithic multicellular chemically inert refractory support of an apparent bulk density of 0.2 to 0.7 g/cc having therein 25 to 300 gas flow channels per square inch of its cross-sectional area and supporting thereon a first deposit of an activated alumina in a weight of 50 to 200 g per liter of the catalyst and a second deposit of a mixture of an activated alumina, at least one heavy metal oxide, and a deposit on said alumina and said heavy metal oxide of from 0.2 to about 1.5 g. palladium per liter of finished catalyst, the weight ratio of the total alumina to the heavy metal oxide being 1:0.2 to 1:0.5, the total weight of the first and second deposits being 130 to 500 g per liter of the catalyst and the average total thickness of the two deposits being 50 to 300 microns, said heavy metal oxide being the oxide of at least one metal selected from the group consisting of copper, chromium, nickel, iron, cobalt and manganese.

6. A catalyst according to claim 5, wherein the heavy metal oxide is the oxide of at least one metal selected from the group consisting of copper, chromium and nickel.

7. A catalyst according to claim 5, wherein the refractory support is formed of a refractory selected from the group consisting of cordielite, alumino-silicates containing lithium, mullite and silicon carbide.

8. A catalyst according to claim 5, wherein the activated alumina is at least one member selected from the group consisting of gamma-, pseudo-gamma-, rho-, eta-, delta-, chi-, kappa- and theta-alumina.

9. An oxidation catalyst for purifying exhaust gases of internal combustion engines consisting essentially of a monolithic multicellular chemically inert refractory support of an apparent bulk density of 0.2 to 0.7 g/cc having therein 25 to 300 gas flow channels per square inch of its cross-sectional area and supporting thereon a first deposit of an activated alumina in a weight of 100 to 375 g per liter of the catalyst, a second deposit of at least one heavy metal oxide, and a deposit on said alumina and said heavy metal oxide from 0.2 to about 1.5 g. palladium per liter of finished catalyst, the weight ratio of the alumina to the heavy metal oxide being 1:0.2 to 1:0.5, the total weight of the first and the second deposits being 130 to 500 g per liter of the catalyst and the average total thickness of the two deposits being 50 to 300 microns, said heavy metal oxide being the oxide of at least one metal selected from the group consisting of copper, chromium, nickel, iron, cobalt and manganese.

10. A catalyst according to claim 9, wherein the heavy metal oxide is the oxide of at least one metal selected from the group consisting of copper, chromium and nickel.

11. A catalyst according to claim 9, wherein the refractory support is formed of a member selected from the group consisting of cordielite, alumino-silicates containing lithium, mullite and silicon carbide.

12. A catalyst according to claim 9, wherein the activated alumina is at least one member selected from the group consisting of gamma-, pseudo-gamma-, rho-, eta-, delta-, chi-, kappa- and theta-alumina.

13. A method of preparing oxidation catalysts for purifying exhaust gases of internal combustion engines consisting essentially of impregnating a monolithic multicellular chemically inert refractory support of an apparent bulk density of 0.2 to 0.7 g/cc having therein 25 to 300 gas flow channels per square inch of its cross-sectional area with a slurry containing a finely divided activated alumina of a particle size distribution that at least 80% by weight of particles are of sizes of 2 to 50 microns and at least one heavy metal oxide or heavy metal compound which forms an oxide on calcining to deposit thereon the two oxides in the weight ratio of the former to latter of 1:0.2 to 1:0.5 and, after drying, calcining it at temperatures of 300° to 600° C to form thereon a deposit layer of a weight of 130 to 500 g per liter of the finished catalyst and of an average thickness of 50 to 300 microns, said heavy metal oxide being the oxide of at least one metal selected from the group consisting of copper, chromium, nickel, iron, cobalt and manganese and, immersing the thus formed catalyst in a water-soluble pallium salt solution to deposit on the catalyst 0.2 to about 1.5 g. palladium per liter of finished catalyst.

14. A method according to claim 13, wherein the slurry contains therein, in addition, at least one member selected from the group consisting of an alumina sol and an aqueous alumina solution.

15. A method of preparing oxidation catalysts for purifying exhaust gases of internal combustion engines consisting essentially of immersing a monolithic multicellular chemically inert refractory support of an apparent bulk density of 0.2 to 0.7 g/cc having therein 25 to 300 gas flow channels per square inch of its cross-sectional area in an aqueous slurry of a finely divided activated alumina of a particle size distribution that at least 80% of particles are of sizes of 2 to 50 microns to deposit thereon alumina in an amount of 50 to 200 g per liter of the catalyst after calcination, calcining, after drying, the so impregnated support at temperatures of 300° to 600° C, immersing the so treated support in an aqueous slurry containing the same activated alumina as designated above and at least one heavy metal oxide or heavy metal compound which forms an oxide on calcining and calcining, after drying, the support at temperatures of 300° to 600° C to deposit thereon the activated alumina and the heavy metal oxide in a weight ratio of the total alumina to the heavy metal oxide of 1:0.2 to 1:0.5 and in the total weight of the two deposits of 130 to 500 g per liter of the finished catalyst to form a deposit layer of an average thickness of 50 to 300 microns, said heavy metal oxide being the oxide of at least one metal selected from the group consisting of copper, chromium, nickel, iron, cobalt and manganese and, immersing the thus formed catalyst in a water-soluble pallium salt solution to deposit on the catalyst 0.2 to about 1.5 g. palladium per liter of finished catalyst.

16. A method according to claim 15, wherein each of the slurries contains therein, in addition, at least one member selected from the group consisting of an alumina sol and an aqueous alumina solution.

17. A method of preparing oxidation catalysts for purifying exhaust gases of internal combustion engines consisting essentially of immersing a monolithic multicellular chemically inert refractory support of an apparent bulk density of 0.2 to 0.7 g/cc having therein 25 to 300 gas flow channels per square inch of its cross-sectional area in an aqueous slurry of a finely divided activated alumina of a particle size distribution that at least 80 percent by weight of particles are of sizes 2 to 50 microns to deposit thereon alumina in an amount of 100 to 375 g per liter of the catalyst after calcination, calcining, after drying, the so impregnateed support at temperatures of 300° to 600°C, immersing the so treated supported in an aqueous solution or slurry containing at least one heavy metal oxide or heavy metal compound which forms an oxide on calcining and calcining, after drying, the support at temperatures of 300° to 600° C to deposit thereon the heavy metal oxide in a weight ratio of the alumina to the heavy metal oxide of 1:0.2 to 1:0.5 and in the total weight of the two deposits of 130 to 500 g per liter of the finished catalyst to form a deposit layer of an average thickness of 50 to 300 microns, said heavy metal oxide being the oxide of at least one metal selected from the group consisting of copper, chromium, nickel, iron, cobalt and manganese and, immersing the thus formed catalyst in a water-soluble pallium salt solution to deposit on the catalyst 0.2 to about 1.5 g. palladium per liter of finished catalyst.

18. A method according to claim 17, wherein the aqueous slurry of the activated alumina contains therein, in addition, at least one member selected from the group consisting of an alumina sol and an aqueous alumina solution.

* * * * *